United States Patent Office 3,547,769
Patented Dec. 15, 1970

3,547,769
FULLY FLEXIBLE HEAT AND PRESSURE CONSOLIDATED DECORATIVE LAMINATE COMPRISING A NITRILE RUBBER LATEX IMPREGNATED BASE, AN ACRYLIC EMULSION IMPREGNATED DECORATIVE PAPER, AND A TRANSPARENT THERMOPLASTIC SURFACE FILM
Donald Joseph Albrinck, Reading, and Ronald James Keeling, Cincinnati, Ohio, assignors to Formica Corporation, Cincinnati, Ohio, a corporation of Delaware
No Drawing. Filed June 27, 1967, Ser. No. 649,125
Int. Cl. B32b 27/08; D06n 7/06
U.S. Cl. 161—248         6 Claims

ABSTRACT OF THE DISCLOSURE

A decorative laminate comprising a heat and pressure consolidated assembly comprising in superimposed relationship at least one dried paper base sheet impregnated with a nitrile rubber latex, followed by a dried decorative paper impregnated with an acrylic emulsion and said decorative sheet being surfaced with a transparent thermoplastic film.

BACKGROUND OF THE INVENTION

Decorative laminates have been produced for a substantial plurality of years in preparing surface materials for the application to tables, vanitories, vertical wall coverings, door coverings, and the like. Ordinarily, these decorative laminates are prepared by assembling in superimposed relationship a plurality of kraft paper core sheets which have been impregnated with a thermosetting phenol-formaldehyde resin. Superimposed above these core sheets which may number between about 1 and 9 core sheets there is positioned a decorative sheet that is impregnated with a thermosetting resin which does not undergo any noticeable deterioration in color, such as darkening, upon the subsequently applied laminating conditions. Typical resins that meet this description are the melamine-formaldehyde resins, the epoxy resins, the unsaturated polyester resins, the urea resins, and the like. The decorative sheet may be a solid color α-cellulose paper sheet which has been dyed or pigmented to a selected color such as white, pink, yellow, and the like, or the decorative sheet may be a print sheet in which some design such as a geometric design or a floral design or a wood print is imparted to the decorative side of the decorative sheet before or after impregnation with the color stable thermosetting resin. Frequently, there is superimposed above the decorative sheet an overlay sheet which is a sheet of fine quality paper such as α-cellulose paper sheet unpigmented again but impregnated with a color stable thermosetting resin, which overlay sheet is superimposed above the decorate sheet, and then the entire assembly is heat and pressure consolidated under conventional conditions of pressure and temperature to product a unitary laminated product. The overlay is used primary when the decorative sheet is a print sheet so as to provide a barrier to avert abrasion of the printed part of the print sheet and thus preserve its printed characteristics intact for prolonged periods of time. More recently, a structure such as that described hereinabove has had the overlay replaced with certain selected thermoplastic films produced from vinyl polymers such as films of poly(methyl methacrylate), blends of poly(methyl methacrylate) with polyvinylidene fluoride, polyvinyl fluoride, and the like.

FIELD OF THE INVENTION

The concept of the present invention is in the field of making laminated plastic articles and, more particularly, decorative, flexible, laminated plastic articles which laminated articles provide better solvent resistance, improved impact resistance, better glueability, more body, less telegraphing of substrate defects, ease of printing, greater flexibility and improved handleability, and when used in combination with an aluminum foil positioned immediately beneath the decorative sheet to provide a surface with improved heat dissipation and, finally, absence of blooming.

DESCRIPTION OF THE PRIOR ART

The known prior art is to be found in the U.S. Pats. 2,563,111, 2,729,585, 2,759,866 and 3,231,457.

SUMMARY OF THE INVENTION

This invention relates to a decorative laminate which has at least three layers, which layers are arranged in super-imposed relationship and then heat and pressure consolidated to a unitary structure. The lowest layer of this three-component laminate is sometimes hereinafter referred to as the base member and comprises at least one sheet of paper and, preferably, unbleached creped kraft paper, which has been impregnated with a nitrile rubber latex. Upon completion of the impregnation of the paper web which can be impregnated continuously, the aqueous portion of the latex or emulsion is then flashed off by passing the impregnated, wet web through a heating chamber or oven or it may be passed through a plurality of heated rolls whereby the temperature is sufficient to evaporate the water from the web thereby leaving the nitrile rubber present on the dried web. The dried web thus produced is ready to be cut into the desired sizes and positioned in the assembly preparatory to making the laminate. The nitrile rubbers may be acquired from a plurality of commercially available sources and are copolymers of either acrylonitrile and/or methacrylonitrile with a copolymerizable rubber latex forming monomer such as one or more of the butadienes. If desired, one may use a terpolymer of the type of rubber latex which is prepared by interpolymerizing acrylonitrile and/or methacrylonitrile with one or more of the butadienes and one or more of the polymerizable styrenes such as styrene per se or the ring-substituted alkyl styrenes such as o-, m-, p-methyl styrene and/or the ring-substituted halo styrenes such as the chloro and bromo ring-substituted styrenes, and the like. It is preferred to make use of a nitrile rubber latex which is prepared by copolymerizing butadiene and acrylonitrile in a conventional latex or emulsion polymerization technique in which the copolymer contains between about 20 and 50 parts, by weight, of acrylonitrile and, correspondingly, between 80 and 50 parts of butadiene and, preferably, between about 25 and 35 parts, by weight, of acrylonitrile and, correspondingly, from about 75 to about 65 parts, by weight, of butadiene. As used, the nitrile rubber latex in the aqueous dispersion may contain between about 35% and 55%, by weight, of solids based on the total weight of the latex and, preferably, between about 45% and 50%, by weight, solids, same basis. As a further preferred embodiment, one may blend with the nitrile rubber latex up to 75 parts, by weight, of a polyvinyl halide latex such as a polyvinyl chloride latex. These polyvinyl halide latices can be prepared by homopolymerizing a vinyl halide or by copolymerizing it with another compatible and copolymerizable monomer in an emulsion or latex emulsion system. The term vinyl halide is deemed to be of sufficient scope to encompass the vinylidene halides as well which can be used as homopolymers or copolymers with one or more compatible monomers copolymerizable therewith in an emulsion or latex polymerization system. Among the vinyl halides which may be used to form this polyvinyl halide latex are vinyl chloride, vinyl fluoride, vinyl bromide, vinyl iodide, vinylidene chloride, vinylidene fluoride, vinylidene bromide, vinylidene iodide, and the like. Among the polymerizable monomers which may be used to form copolymers, terpolymers, and the like with the vinyl halides are such polymerizable monomers as styrene, the ring-substituted halo and alkyl substituted styrenes such as o-, m-, p-chloro styrene, o-, m-, p-bromo styrene, and the like or the 2,4-dichloro styrene, 2,5-dichloro styrene, 3,4-dibromo styrene and the like. Additionally, one could use the o-, m-, p-ethyl styrene and the like or the 2,4-dimethyl styrene, the 2,5-diethyl styrene, and the like. One may use additionally such polymerizable monomers as acrylic acid, methacrylic acid and their esters such as the methyl, ethyl, isopropyl, butyl methacrylates and ethacrylates. It is ordinarily desired that there be used a preponderant amount of the vinyl halide in the copolymer such as about 75 parts of the vinyl halide and, correspondingly, about 25 parts of the corresponding copolymerizable monomers. A particularly useful polyvinyl halide copolymer latex is one prepared by emulsifying 95 parts of vinyl chloride with 5 parts of ethyl acrylate, which copolymer contains no conventional nonpolymeric plasticizers. This vinyl latex may be present in an amount varying between 0% and 75%, whereas the nitrile rubber latex may be present correspondingly in an amount varying between 100% and 25%, by weight, based on the total weight of solids constituents in the latex. It is preferred to use in the blend from about 40% to about 60%, by weight, of the vinyl latex and, correspondingly, from about 60% to about 40%, by weight, of the nitrile rubber latex, same basis as before. It will be apparent that when percentages by weight in the blend are given in corresponding terms, it is obvious that the total amount of the separate components are additively 100%. The filler paper used in the base member will be a conventional type or absorbant filler paper, of which a plurality are available commercially such as the unbleached creped kraft paper (Mosinee R-3-B), having an apparent density of 0.327 g./cc. The base paper is treated with the nitrile rubber or resin blend using typical paper saturating techniques to a resin pick-up within the range of from about 45 to about 75%, by weight, based on the total weight of the impregnated, dried paper and, preferably, between about 50% and 68%, by weight, of the resin solids based on the total weight of the impregnated dried paper. The base paper thus treated and dried provides a stable, tack-free sheet.

The decorative sheet may be prepared from a fine quality α-cellulose paper which may have a basis weight of from about 45 to 123 lbs. and, preferably, between about 60 and 70 lbs. The decorative paper may be impregnated solely with the acrylic emulsion as is defined in greater detail hereinbelow. As a preferred embodiment, however, it is desired to make use of a resin blend comprising from 25% to 100% of the acrylic polymer solids in the emulsion and, correspondingly, from 75% to 0%, by weight, of a water dispersible thermosetting melamine-formaldehyde resin. It is preferred that there be used between about 50% and 80%, by weight, of the acrylic polymer solids in the emulsion and, correspondingly, from about 50% to about 20%, by weight, of the thermosetting water dispersible melamine-formaldehyde resin solids in the emulsion. The total solids in the emulsion, whether it be the acrylic polymer alone or the blend of the melamine-formaldehyde resin, may be in the range of about 25% to about 50%, by weight of polymer and resin solids based on the total weight of the aqueous dispersion and, preferably, between about 30% and 40% solids, same basis. The decorative paper is impregnated with the acrylic emulsion or acrylic emulsion-melamine resin blend by passing a continuous web of the decorative paper through the treating bath by use of typical saturating techniques in order to provide a resin pick-up in the range of 30% to 50%, by weight, based on the total weight of the impregnated, dried paper and, preferably, from about 35% to 40%, by weight, of resin or polymer solids based on the total weight of the treated dried sheet. The thus treated web may then be dried in a conventional manner similar to the technique used to dry the base paper during which the resinous or polymeric components in the treated web is dried to a stable tack-free sheet. The acyrlic emulsion used to impregnate the decorative sheet may be comprised of a homopolymer of a single acrylic monomer such as methyl methacrylate, ethyl methacrylate, ethyl acrylate, propyl acrylate, butyl acrylate, and the like, or the acrylic emulsion may be comprised of copolymers, terpolymers, and the like, of such acrylic monomers as those referred to hereinabove copolymerized with one another or with acrylic acid, methacrylic acid, ethacrylic acid, and the like. A substantial plurality of these acrylic emulsions are available commercially such as the Rohm and Haas Rhoplex B-15 which is particularly suitable for use in impregnating the decorative sheet.

The impregnated decorative sheet is then surfaced with a transparent thermoplastic film. The thermoplastic transparent film used as the surface layer may be any transparent colorless thermoplastic film containing no plasticizer or plasticized very lightly with a non-migratory polymeric plasticizer, including such plasticizers as rubber polymers and copolymers may be used for the laminate surface. The essential feature of this thermoplastic film is to impart to the laminate surface a good stain and solvent resistance. Any film containing a plasticizer which impairs this resistance is, therefore, not acceptable. Additionally, any thermoplastic film which is soluble in common solvents to any significant extent such as alcohols, acetates, carbon tetrachloride and the like, is unacceptable. The thickness of the surface film is not critical, but economics and commercial availability tend to dictate that the film be selected from those having a thickness between about 0.5 and 6 mils and, preferably, between about 2 and 4 mils. Illustrative of the type of thermoplastic transparent films which may be used for the surface layer of the laminates of the present invention are polyvinyl chloride films, either plasticized lightly or unplasticized, films of polyacrylonitrile, films of nylon, films of chlorinated polyethers, films of polyesters, films of polycarbonates, films of poly(methyl methacrylate), films of blends of poly(methyl methacrylate) with polyvinylidene fluoride and films of Dupont Surlyn A, a commercially available copolymer of ethylene copolymerized with a monomer containing carboxyl groups to provide an ionically reactive site. One of the preferred vinyl films which may be used to surface the laminate of the present invention is polyvinyl chloride which may be used as a homopolymer or as a copolymer prepared by copolymerizing vinyl chloride with minor amounts such as 15% or less of the acrylates such as methacrylates, ethacrylates, propyl acrylates, butyl acrylates, methyl methacrylate, ethyl methacrylate, methylethacrylate, ethylethacrylate, vinyl acetate, vinyl propionate, and the like. These surface films may contain, if desired, small quantities of plasticizer in an amount of 5% or less such as a commercially available epoxy, ester-metal salts, urethane extended epoxies and other conventional plasticizers such as dibutyl phthalate, dioctyl phthalate, and the like.

In producing the decorative laminates of the present invention, a variety of press cycles may be used such as by varying the pressure between about 200 and 1400 p.s.i. with temperatures between about 135° C. and 260° C. and press times from about five seconds to about 30 minutes. Ordinarily, the time factor diminishes as the temperatures and pressures are increased and vice-versa. If a fully flexible laminate is desired, the core sheets should be eliminated altogether or kept to a minimum such as between about 1 and 4 core sheets as hereinabove defined or sheets similar to the base sheet hereinabove defined. Laminates prepared by increasing the number of core sheets from 1 to 4 all gave satisfactory products but with slightly increased stiffness with the increased number of core sheets. If flexibility of the laminate is less important than rigidity, a plurality of core sheets even in excess of 4 can be used up to about 8 or 9, but beyond that, nothing of significance is to be gained by increasing the total number of core sheets.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

A laminate is prepared by using 2 mil thick transparent rigid unplasticized polyvinyl chloride film surfaced over an α-cellulose decorative sheet of 65 lbs. basis weight treated to a resin level of 39% solids with a polyblend of 75 parts of an acrylic emulsion prepared by copolymerizing about 98 parts of ethyl acrylate with 2 parts of acrylic acid in a conventional emulsion polymerization system and 25 parts of a commercially available thermosetting melamine-formaldehyde impregnating resin over a filler sheet of 31 lbs. of unbleached, absorbent creped kraft paper treated to a resin level of 50% with a polyblend resin of 55 parts of a polyvinyl chloride latex and 45 parts of an acrylonitrile-butadiene rubber latex (35/65 A:B, respectively), all laminated together at a maximum temperature of 146° C., 1400 p.s.i. pressure for 15 minutes in a veneer pack in a flat bed press. A plurality of these laminates were pressed simultaneously in the press and were separated from one another with suitable release sheets. One of the laminates produced hereinabove was subjected to a plurality of tests and displayed the following properties:

| | |
|---|---|
| NEMA impact (LD1-2.15) | >116″. |
| Minimum radius (room temp.) | 0″. |
| CS 17 abrasion | 9200 cycles. |
| Stains | No NEMA stains on short contact. |
| Peel strength (vinyl-print) | 4.2 lbs./lineal inch. |
| Thickness | .011″. |

EXAMPLE 2

Example 1 is repeaed in all essential details except that the decorative sheet was impregnated with 100 parts of the same acrylic emulsion and no melamine-formaldehyde resin was used. The properties of the laminate thus produced are favorably comparable to those produced in Example 1.

EXAMPLE 3

Example 1 is repeated in all essential details except that the blend ratio in the decorative sheet is comprised of 50 parts of the same acrylic emulsion and 50 parts of the same melamine-formaldehyde impregnating resin. The properties of the laminate thus produced are favorably comparable to that produced in Example 1 except for slightly reduced impact resistance, slightly increased minimum radius and slightly reduced polyvinyl chloride-decorative sheet bond.

EXAMPLE 4

Example 1 is repeated in all essential details except that the base sheet is replaced with an uncreped, unbleached kraft of 43 lb. basis weight. The properties of this laminate are favorably comparable to those produced in Example 1 except that the thickness is increased to 0.0125″ and the minimum radius is slightly increased.

EXAMPLE 5

The procedures of Example 1 is repeated in all essential details except that the base sheet is replaced with a creped, unbleached kraft paper sheet of 50 lb. basis weight. The properties of this laminate are similar to those of Example 1 except that the thickness is .013″.

EXAMPLE 6

Example 1 is repeated in all essential details except that the base sheet contains 68% of the resin blend based on the total weight of the dried base sheet and resin. The properties of this laminate are the same as those of Example 1 except that the thickness is .013″.

EXAMPLE 7

Example 1 is repeated in all essential details except that the filler is treated to a 68% pick-up with a nitrile rubber latex containing 28 parts of acrylonitrile and 72 parts of butadiene. The properties of this laminate are the same as those of Example 1.

EXAMPLE 8

Example 1 is repeated in all essential details except that the base is treated to a 68% resin pick-up with a 25/75 blend of polyvinyl chloride latex with the same nitrile rubber latex. The properties of this laminate are essentially the same as those described in Example 1.

EXAMPLE 9

The process of Example 1 is repeated in all essential details except that instead of using a flat press the layers are compressed together into uniform product using a continuous laminating process by passing the assembly through a series of heated nip rolls. The properties of this laminate are the same as in Example 1.

EXAMPLE 10

Example 3 is repeated in all essential details except that the processing technique of a continuous laminating press of Example 9 was used. The properties of this laminate are favorably comparable with those shown in Example 1.

EXAMPLE 11

Example 3 is repeated in all essential details except that in the place of the 2 mil polyvinyl chloride transparent film there is substituted a 2 mil transparent film of nylon. A further difference resided in the fact that the laminate was processed in a continuous laminating operation using the apparatus shown in the U.S. Pat. 3,159,526. The final laminate has superior stain resistance and forming radius.

EXAMPLE 12

Example 3 is repeated in all essential details except that the polyvinyl chloride surface film is replaced with a clear nylon film and the entire assembly is heat and pressure consolidated into a unitary structure by the process of Example 1. The properties of this laminate are essentially the same as those of Example 1 except for superior solvent resistance.

EXAMPLE 13

Example 12 is repeated in all essential details except that the clear nylon film is replaced with a clear film of polyacrylonitrile. The properties of the laminate thus produced are favorably comparable to those of Example 1 except for excellent stain resistance.

EXAMPLE 14

Example 11 is repeated in all essential details except that the nylon film is replaced by a commercially available clear film of a chlorinated polyether of the same thickness. The properties are similar to those of the laminate described in Example 1 except for improved stain resistance.

EXAMPLE 15

Example 12 is repeated in all essential details except that the clear nylon film is replaced by a clear film of unplasticized polyvinylidene chloride of the same thickness. The properties of this laminate are comparable to those described in Example 12.

EXAMPLE 16

Example 12 is repeated in all essential details except that the nylon film surface layer is replaced by a commercially available clear film of polycarbonate. The properties of the laminate are similar to Example 1 except for reduced stain resistance.

EXAMPLE 17

Example 12 is repeated in all essential details except that the clear nylon film is replaced by a clear film of a commercially available polyester resin. The properties of this laminate are similar to those described in Example 1.

EXAMPLE 18

Example 1 is repeated in all essential details except that a bondable aluminum foil is positioned between the decorative layer and the base layer. The properties of the laminate thus produced are comparable to those of Example 1 except for the greatly enhanced thermal properties, namely, heat and cigarette burn resistance.

EXAMPLE 19

Example 1 is repeated in all essential details except that three core sheets are incorporated between the decorative sheet and the base sheet. The core sheets had been pre-impregnated with the same resin system used in the base sheet. The properties of the laminate thus produced are favorably comparable to those of Example 1 except for the increased thickness, body and rigidity.

EXAMPLE 20

Example 1 is repeated in all essential details except that the layers are formed into a uniform product by exerting a pressure of 300 p.s.i. The properties of this laminate are favorably comparable to those of Example 1.

EXAMPLE 21

Example 12 is repeated in all essential details except that the clear nylon surface film is replaced by a clear film comprising a blend of 60 parts of poly(methyl methacrylate) and 40 parts of polyvinylidene chloride of the same thickness. The properties of this laminate are comparable to those produced in Example 1 except for the improved outdoor weatherability.

EXAMPLE 22

Example 1 is repeated in all essential details except that under the base sheet there is positioned a rigid wooden board and the lamination is accomplished in one step with the use of a continuous laminating press comparable to that used in Example 11.

EXAMPLE 23

Example 1 is repeated in all essential details except that the polyvinyl chloride film is replaced by a clear film of a commercially available homopolymer blend or copolymer of a 80/20 methyl methacrylate/ethylacrylate, respectively.

We claim:

1. A fully flexible heat and pressure consolidated decorative laminate consisting essentially of in superimposed relationship at least one dried paper base sheet impregnated with from about 45% to about 75% by weight based on the total weight of the impregnated dried paper of a nitrile rubber composition containing from about 25% to 100% of nitrile rubber latex and from 75% to 0% by weight of a polyvinyl halide latex, followed by a dried decorative paper impregnated with from about 30% to about 50% by weight based on the total weight of the impregnated dried paper of an acrylic polymer composition derived from an acrylic polymer emulsion containing from about 25% to about 50% solids of from about 25% to 100% of an acrylic polymer and correspondingly from 75% to 0% by weight of a water dispersible thermosetting melamine-formaldehyde resin and said decorative sheet having superimposed thereon a thin transparent thermoplastic surface film containing not more than 5% by weight of a plasticizer.

2. The decorative laminate according to claim 1 in which the nitrile rubber composition is comprised of a blend of at least 25%, by weight, of said nitrile rubber latex and correpondingly not more than 75% of a polyvinyl halide latex.

3. The decorative laminate according to claim 1 in which the decorative sheet is impregnated with a blend of about 50–80%, by weight, of an acrylic emulsion and correspondingly from about 50–20%, by weight, of a thermosetting melamine-formaldehyde resin.

4. A decorative laminate according to claim 1 in which the nitrile rubber composition is comprised of a blend of about 40–60% by weight, of said nitrile rubber latex and correspondingly from about 60–40% of a polyvinyl halide latex.

5. The decorative laminate according to claim 1 in which the decorative sheet is impregnated with a blend of at least 25%, by weight, of an acrylic emulsion and correspondingly not more than 75%, by weight, of a thermosetting melamine-formaldehyde resin and in which the nitrile rubber composition is comprised of a blend of at least 25%, by weight, of said nitrile rubber latex and correspondingly not more than 75% of a polyvinyl halide latex.

6. The decorative laminate according to claim 1 in which the decorative sheet is impregnated with a blend of about 50–80%, by weight, of an acrylic emulsion and correspondingly from about 50–20%, by weight, of a thermosetting melamine-formaldehyde resin, and in which the nitrile rubber composition is comprised of a blend of about 40–60%, by weight, of said nitrile rubber latex and correspondingly about 60–40% of a polyvinyl halide latex.

References Cited

UNITED STATES PATENTS

| | | | |
|---|---|---|---|
| 2,563,111 | 8/1951 | Hampson et al. | 161 wear overlay |
| 2,759,866 | 8/1956 | Seymour | 161—251X |
| 3,097,180 | 7/1963 | Tausch | 260—891X |
| 3,218,225 | 11/1965 | Petropoulos | 161—413X |
| 3,231,457 | 1/1966 | Meissner | 161—413X |
| 3,340,137 | 9/1967 | Kamal | 161—248X |
| 3,345,248 | 10/1967 | Pounds et al. | 161—248 |

JOHN T. GOOLKASIAN, Primary Examiner

R. A. KILLWORTH, Assistant Examiner

U.S. Cl. X.R.

156—332; 161—253, 254, 263, 413; 260—851, 891

UNITED STATES PATENT OFFICE
CERTIFICATE OF CORRECTION

Patent No. 3,547,769　　　　　　　Dated December 15, 1971

Inventor(s) Donald Joseph Albrinck and Ronald James Keeling

It is certified that error appears in the above-identified patent and that said Letters Patent are hereby corrected as shown below:

Column 1, line 59, change "product" to --produce--.

Column 3, line 36, change "or" to --of--.

Column 5, line 48, change "repeaed" to --repeated--.

Column 7, line 43 Example 21 change "chloride" to --fluoride--

Signed and sealed this 30th day of March 1971.

(SEAL)
Attest:

EDWARD M. FLETCHER, JR.　　　　　WILLIAM E. SCHUYLER, JR.
Attesting Officer　　　　　　　　Commissioner of Patents